US009685291B2

(12) United States Patent
Bachman et al.

(10) Patent No.: US 9,685,291 B2
(45) Date of Patent: Jun. 20, 2017

(54) FREQUENCY ADDRESSABLE MICROACTUATORS

(75) Inventors: Mark Bachman, Irvine, CA (US); Guann-Pyng Li, Irvine, CA (US); Minfeng Wang, Irvine, CA (US); Yang Zhang, Irvine, CA (US); Brent Puohan Lin, Chino Hills, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 1022 days.

(21) Appl. No.: 13/415,840

(22) Filed: Mar. 8, 2012

(65) Prior Publication Data

US 2012/0275079 A1    Nov. 1, 2012

Related U.S. Application Data

(60) Provisional application No. 61/450,507, filed on Mar. 8, 2011.

(51) Int. Cl.
| | | |
|---|---|---|
| *H01H 51/32* | (2006.01) | |
| *H01H 50/00* | (2006.01) | |
| *G02B 26/08* | (2006.01) | |
| *H01H 1/00* | (2006.01) | |
| *H01H 59/00* | (2006.01) | |

(52) U.S. Cl.
CPC ....... *H01H 50/005* (2013.01); *G02B 26/0833* (2013.01); *H01H 2001/0042* (2013.01); *H01H 2001/0084* (2013.01); *H01H 2059/0036* (2013.01)

(58) Field of Classification Search
CPC .............. H01H 51/32; H01H 50/005; H01H 2001/0042; H01H 2001/0084; H01H 2059/0036; G02B 26/0833
USPC ............................ 361/184; 700/24, 295, 296
See application file for complete search history.

(56) References Cited

U.S. PATENT DOCUMENTS

| | | | | |
|---|---|---|---|---|
| 4,392,089 | A  * | 7/1983 | Lester ................. | H05B 41/392 307/116 |
| 5,721,566 | A  * | 2/1998 | Rosenberg et al. ........... | 345/161 |
| 6,661,403 | B1 * | 12/2003 | Rosenberg et al. ........... | 345/156 |
| 2003/0043003 | A1 * | 3/2003 | Vollmers et al. ............... | 335/78 |
| 2003/0169135 | A1 * | 9/2003 | Shen et al. ...................... | 335/78 |
| 2009/0115292 | A1 * | 5/2009 | Ueda ..................... | H02N 2/043 310/338 |

(Continued)

*Primary Examiner* — Zeev V Kitov
(74) *Attorney, Agent, or Firm* — One LLP

(57) ABSTRACT

Frequency addressable micro-actuators having one or more movable resonating elements actuators, such as cantilevers, can be forced into oscillation by, e.g., electromagnetic actuation. The movable structure is designed to latch at a certain amplitude using one of several latching techniques, such as a near-field magnetic field. In operation, the movable element is driven into resonance, producing a large amplitude, which results in the structure latching. Through resonance, a small force applied in a repeating manner can result in the latching of the actuator, an operation which would normally require a large force. If two or more units, each with different harmonic frequencies, are placed under the same influence, only the one with a harmonic response to the driving force will latch. A single influencing signal may be used to latch more than one device on demand by tuning the frequency to match the natural frequency of the device of interest.

18 Claims, 11 Drawing Sheets

(56) References Cited

U.S. PATENT DOCUMENTS

2009/0190968 A1\* 7/2009 Mestha .............. G03G 15/0818
                                                     399/266

\* cited by examiner

FREQUENCY ADDRESSABLE MICROACTUATORS

CROSS-REFERENCE TO RELATED APPLICATIONS

This application claims the benefit of U.S. Provisional Application No. 61/450,507 filed Mar. 8, 2011, which application is incorporated herein by reference.

FIELD

The embodiments described herein generally relate to a system of actuators that are driven using a harmonic driving force, the use of resonant frequency for addressing one or more the actuators, and the use of such a device in different state-based applications such as an electrical switches or micro-mirrors.

BACKGROUND INFORMATION

Most micro-devices use direct actuation technique to drive an actuating element into a given state. Examples include electrostatic, piezoelectric, thermal, and electromagnetic actuation. The most common application of microactuators is in micro-switches, where a switching element armature is moved to make an electrical contact between two or more electrical conductors. Oscillating actuation to drive the actuator into a given latched state is not common.

Microactuators are typically directly driven by a control line wire that provides the actuation energy electricity. The use of direct wiring to "address" a device, i.e., to actuate one device and not others, requires each device to have its own actuating wiring or the use of additional electronics to interpret an addressing signal and drive each actuator. This requires multiple wires to be routed to drive multiple actuators. The use of one or more wires per actuator causes a problem in managing space when routing electrical traces on a circuit board. As the number of actuators becomes large more than 3 or 4, the routing problem for the actuation lines becomes very difficult.

There are no known systems that use a single address line to actuate multiple devices, and no known systems that use frequency or time varying waveform to selectively drive a single device on a bus of multiple actuators. Accordingly, it would be desirable to have systems and methods that use a single address line to actuate multiple devices using a waveform that is designed to produce a specific response in the actuator. The simplest example of this is using a harmonic driving force corresponding to the resonant frequency of the actuator.

SUMMARY

The embodiments provided herein are directed to a system of electromechanical actuators with movable structures that can be latched into a state by driving them with a time varying electrical signal. Each actuator contains one or more movable elements, such as cantilevers, that can be forced into oscillation, such as by electromagnetic actuation. The movable structure is designed to latch at a certain amplitude using one of several latching techniques, such as a near-field magnetic field. After latching, the moving element does not move, and is thus placed in a fixed state. In the intended operation, the movable element is driven into movement that is unique to its mechanical construction, such as resonance, causing it to latch and switch states. In this manner, several devices may be actuated by the same signal, but only one may latch into a new state. If the movement is resonant, then the driving signal would be periodic. Other drive—response mechanisms can be utilized to uniquely actuate a device, such as impulse and time response.

In the case of resonance, the devices can produce a large amplitude at relatively small driving energy, which in turn results in the structure latching. In this manner, through resonance, a small force applied in a repeating manner can result in the latching of the actuator, an operation which would normally require a large force. If two or more of these units, each with different harmonic frequencies, are placed under the same influence, only the one with a harmonic response to the driving force will latch. In this manner, a single influencing signal may be used to latch more than one device on demand by tuning the frequency to match the natural frequency of the device of interest.

The embodiments provided herein require only a single actuation wire to control several actuators on a control bus. Since a single wire can carry electrical signals of different frequencies and waveforms, it may be used to safely actuate specific actuators on the control bus without significantly actuating others. Thus multiple actuators may share a single control bus. This results in a great space savings and a simplified routing design for multiple actuators on a board. The same approach may be used to drive one or more actuators into a latched state by providing a broadly acting force, such as an oscillating magnetic field in the presence of multiple magnetic actuators. This approach may be used to produce frequency addressable magnetically actuated electronic switches, optical devices such as mirrors, and other systems which require multiple mechanical structures to be addressibly moved into a given latched state.

Other systems, methods, features and advantages of the invention will be or will become apparent to one with skill in the art upon examination of the following figures and detailed description.

DESCRIPTION OF THE DRAWINGS

The details of the invention, including fabrication, structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

DESCRIPTION OF EMBODIMENTS

Figure 1:
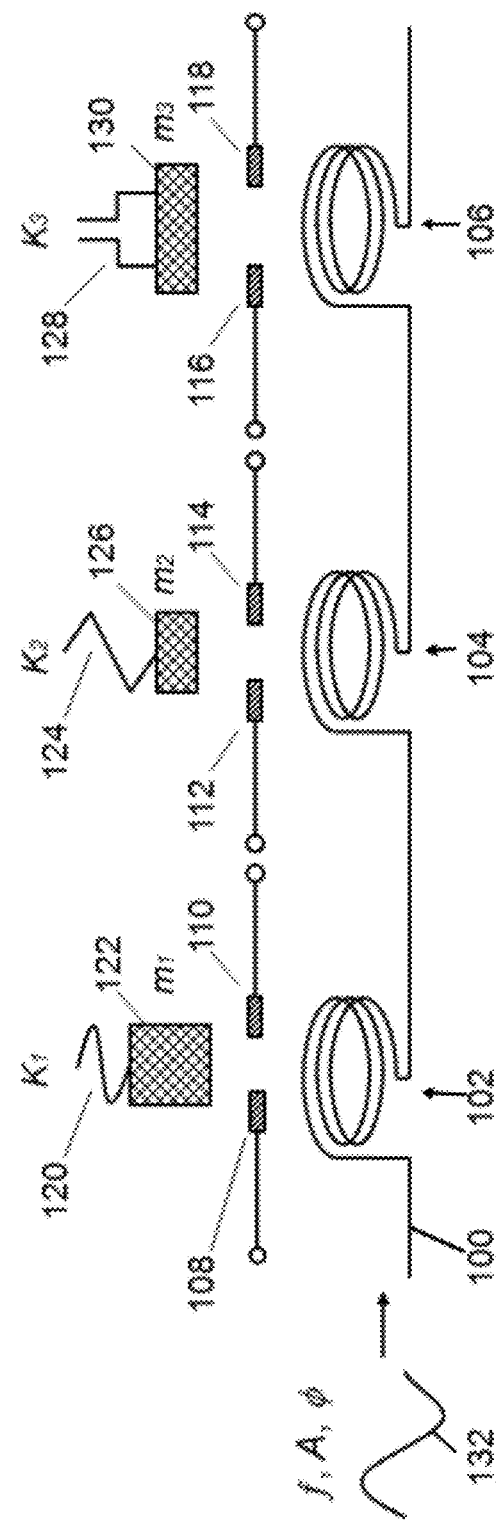
FIG. 1 shows a representative system of actuators having different mechanical responses to a time varying signal.

The embodiments provided herein are directed to a system of actuators that each possess unique response to a time varying actuating signal, and which may be latched by a time varying actuating signal. In the preferred embodiment, the actuators contain one or more movable resonating elements actuators, such as cantilevers, that can be forced into oscillation, such as by electromagnetic actuation. The movable structure is designed to latch at a certain amplitude using one of several latching techniques, such as a near-field magnetic field. After latching, the moving element does not move, and is thus placed in a fixed state. In the intended operation, the movable element is driven into movement that is unique to its mechanical construction, such as resonance, causing it to latch and switch states. In this manner, several devices may be actuated by the same signal, but only one may latch into a new state. If the movement is resonant, then the driving signal would be periodic. Other drive—response mechanisms can be utilized to uniquely actuate a device, such as impulse and time response.

In the case of resonance, the devices can produce a large amplitude at relatively small driving energy, which in turn results in the structure latching. In this manner, through resonance, a small force applied in a repeating manner can result in the latching of the actuator, an operation which would normally require a large force. If two or more of these units, each with different harmonic frequencies, are placed under the same influence, only the one with a harmonic response to the driving force will latch. In this manner, a single influencing signal may be used to latch more than one device on demand by tuning the frequency to match the natural frequency of the device of interest.

The embodiments provided herein require only a single actuation wire to control several actuators a control bus. Since a single wire can carry electrical signals of different frequencies and waveforms, it may be used to safely actuate specific actuators on the control bus without significantly actuating others. Thus multiple actuators may share a single control bus. This results in a great space savings and a simplified routing design for multiple actuators on a board. The same approach may be used to drive one or more actuators into a latched state by providing a broadly acting force, such as an oscillating magnetic field in the presence of multiple magnetic actuators. The same approach may exploit other time varying responses of the moving mechanical element, such as its response to an impulse, or non-linear response at large driving forces, in order to selectively actuate a single device from a system of several devices that are exposed to the same actuation energy. This approach may be used to produce frequency addressable magnetically actuated electronic switches, optical devices such as mirrors, and other systems which require multiple mechanical structures to be addressable moved into a given latched state.

Referring to FIG. 1, a system of electromechanical devices are designed to latch into an "on" state when actuated by an actuation line 100. If electrical energy is passed into the actuation line, it may latch any of the devices 102, 104, 106 into their "on" state, by pulling down an electrical contact that produces a short circuit between terminals, such as between 108 and 110, 112 and 114, 116 and 118. Each device is constructed differently such that each has a unique mechanical response to the actuation energy. For example, device 102 may have an effective spring constant 120 and mass 122, that are different from the spring constants and masses 124, 126, 128, 130 for the other devices 104, 106. The entire system is driven by a time varying signal 132 that can be modified to elicit movement in the actuators. The signal may be modified to actuate each device at a different degree of response than the others. The amplitude, phase, and frequency are all features that may be modulated in order to actuate each of the devices.

Figure 2:
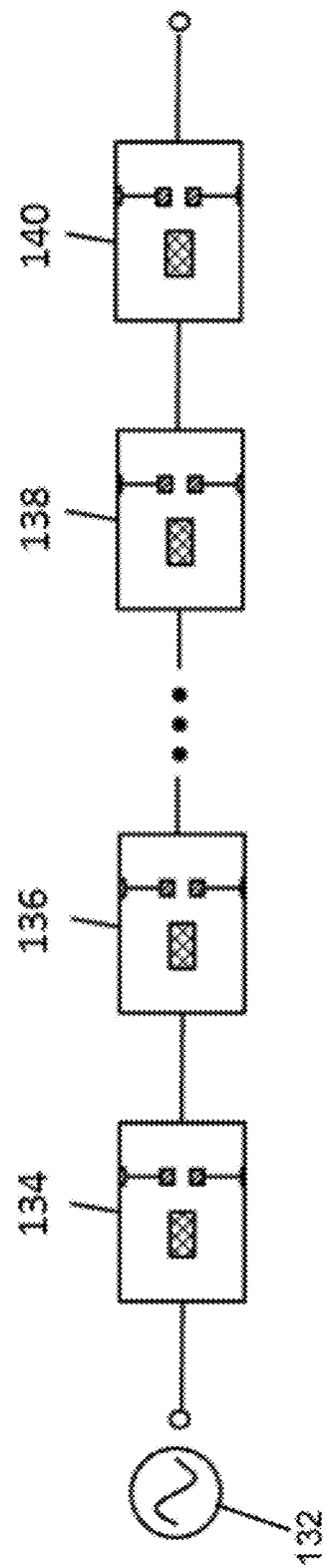
FIG. 2 shows a series topology for a system of actuators.

FIG. 2 shows a series topology for a system of actuators. In this configuration, the devices are all placed on a single wire that passes in series through each device 134, 136, 138, 140. This topology is most suited for devices that are actuated by current, such as thermal and magnetic actuators.

Figure 3:
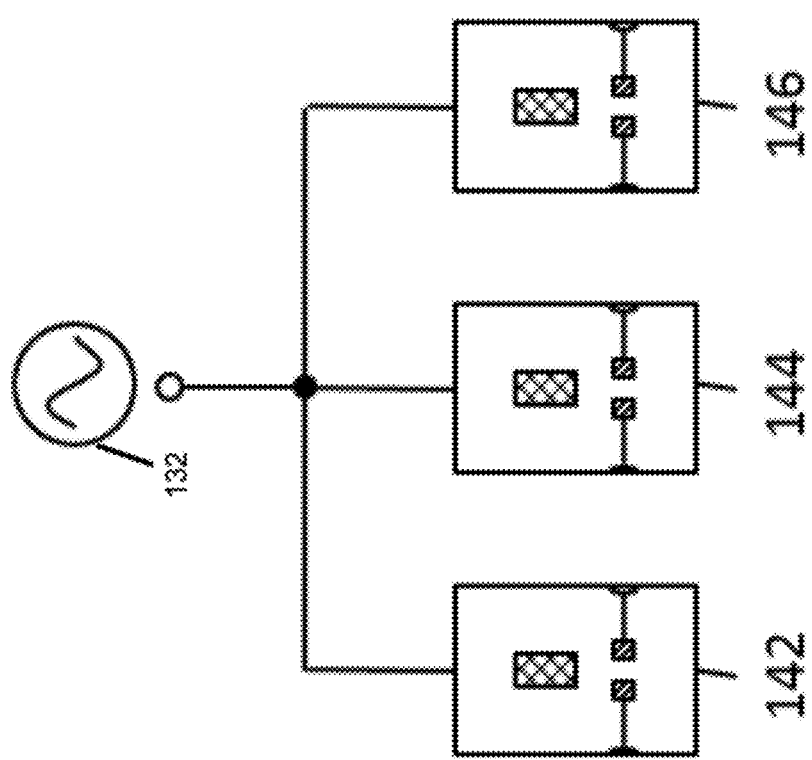
FIG. 3 shows a parallel topology for a system of actuators.

FIG. 3 shows a parallel topology for a system of actuators. In this configuration, the devices 142, 144, 146 are all placed in parallel to the original signal, so that the signal is split and sent to each actuator independently. This topology is most suited to devices that are actuated by voltage, such as electrostatic and piezoelectric actuators.

Figure 4:
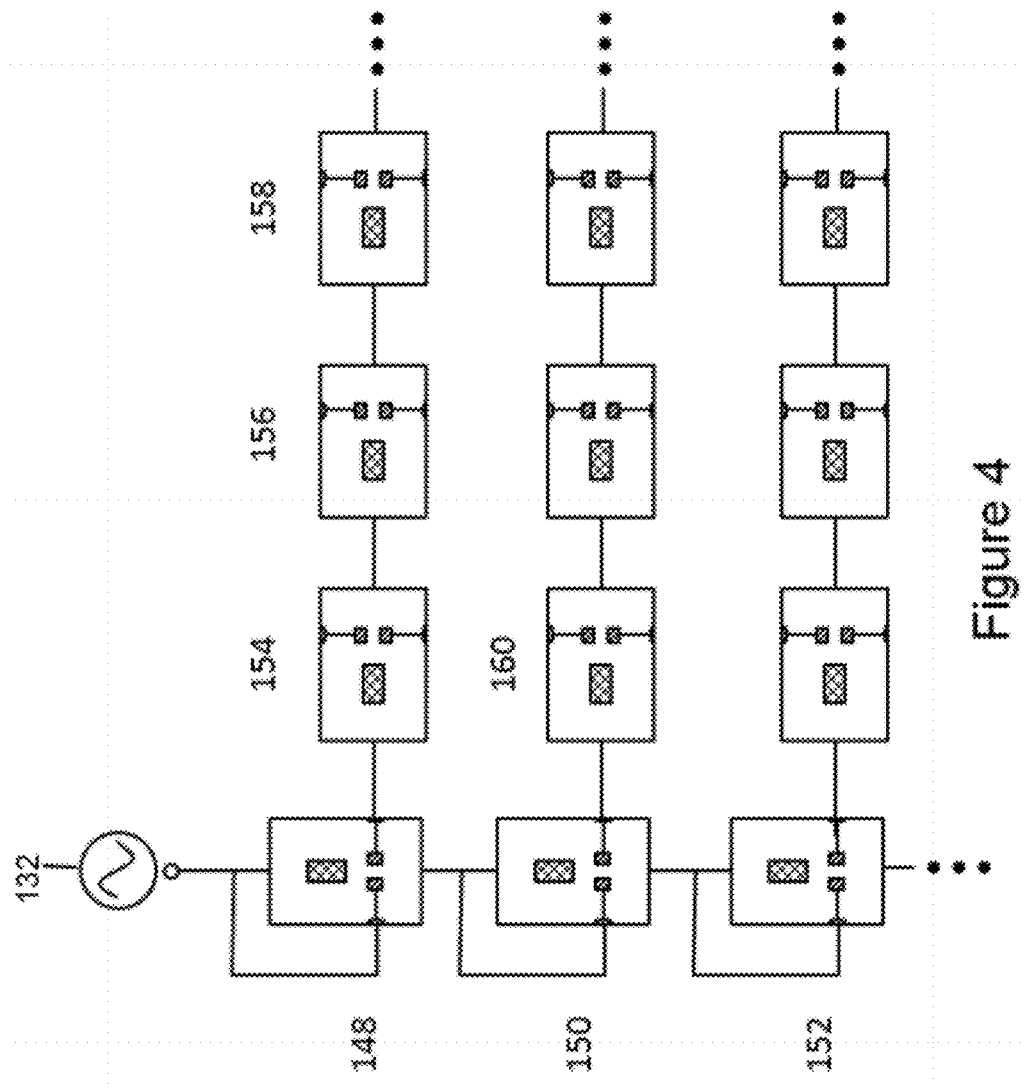
FIG. 4 shows a branched topology for a system of actuators.

FIG. 4 shows a branched topology that allows greater multiplexing. In this configuration, one or more devices are designed as addressable switches 148, 150, 152 which serve to switch the actuation line. Each line switch is actuated using a time varying signal 132. If a first switch 148 is actuated and latched, then the control line is connected to a line connected to the first switch containing a set of other addressable actuators 154, 156, 158. An addressable actuator on another branch 160 may have the same response as an actuator on the first branch 154, 156, 158 but since its control line is not switched it will not be actuated even if the primary signal 146 matches its response. In operation, a first signal is sent to actuate and latch a first control switch, then a second signal is used to control secondary actuators downstream on the branch of the first control switch.

Figure 5:
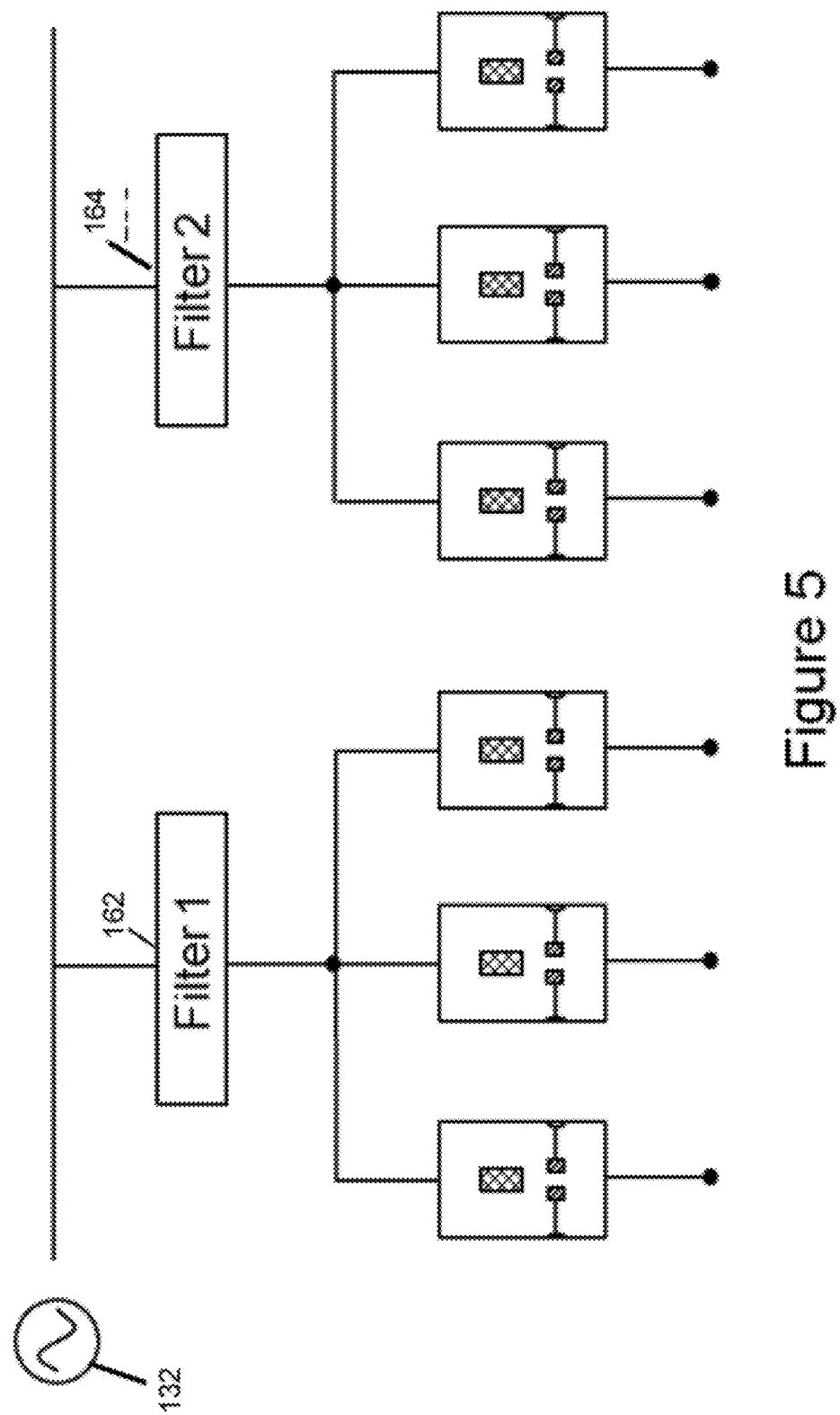
FIG. 5 shows a system of actuators with inline filters.

FIG. 5 shows how inline filters may be used to increase the number of switches that may be addressed. In this configuration, a first filter 162 is used to filter signals that may correspond to secondary or higher harmonics that may accidentally latch the actuators downstream of the filter. Thus, higher frequencies may be safely used to actuate a second set of switches 164 without also actuating the first set. A second filter may be used to protect these actuators from their secondary or higher harmonics that may accidentally latch when even higher frequencies are used. The filters may be configured as low pass, band pass, high pass, or any combination of these.

Figure 6:
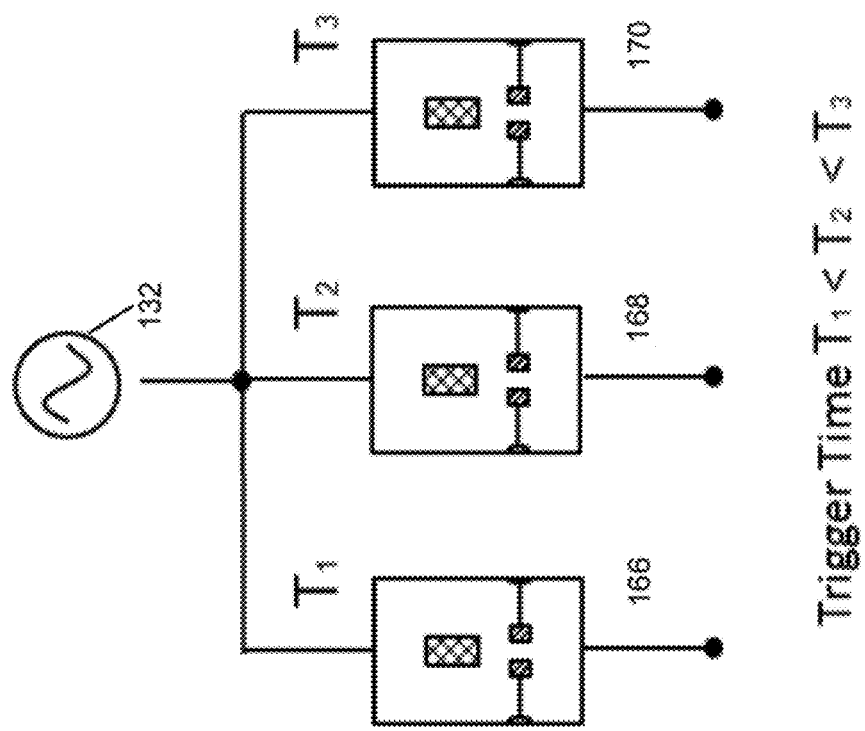
FIG. 6 shows a parallel topology for a system of actuators with time and frequency based response actuation.

FIG. 6 shows a configuration where time response is used in addition to frequency response to produce unique actuation states. In this example, a driving signal 132 is used to drive actuators 166, 168, 170. Actuator 166 is designed to respond faster than 168, so one may switch on only 166 but not 168 even though both have the same harmonic frequency. Similarly, 166 and 168 may be switched on without switching 170.

Figure 7:
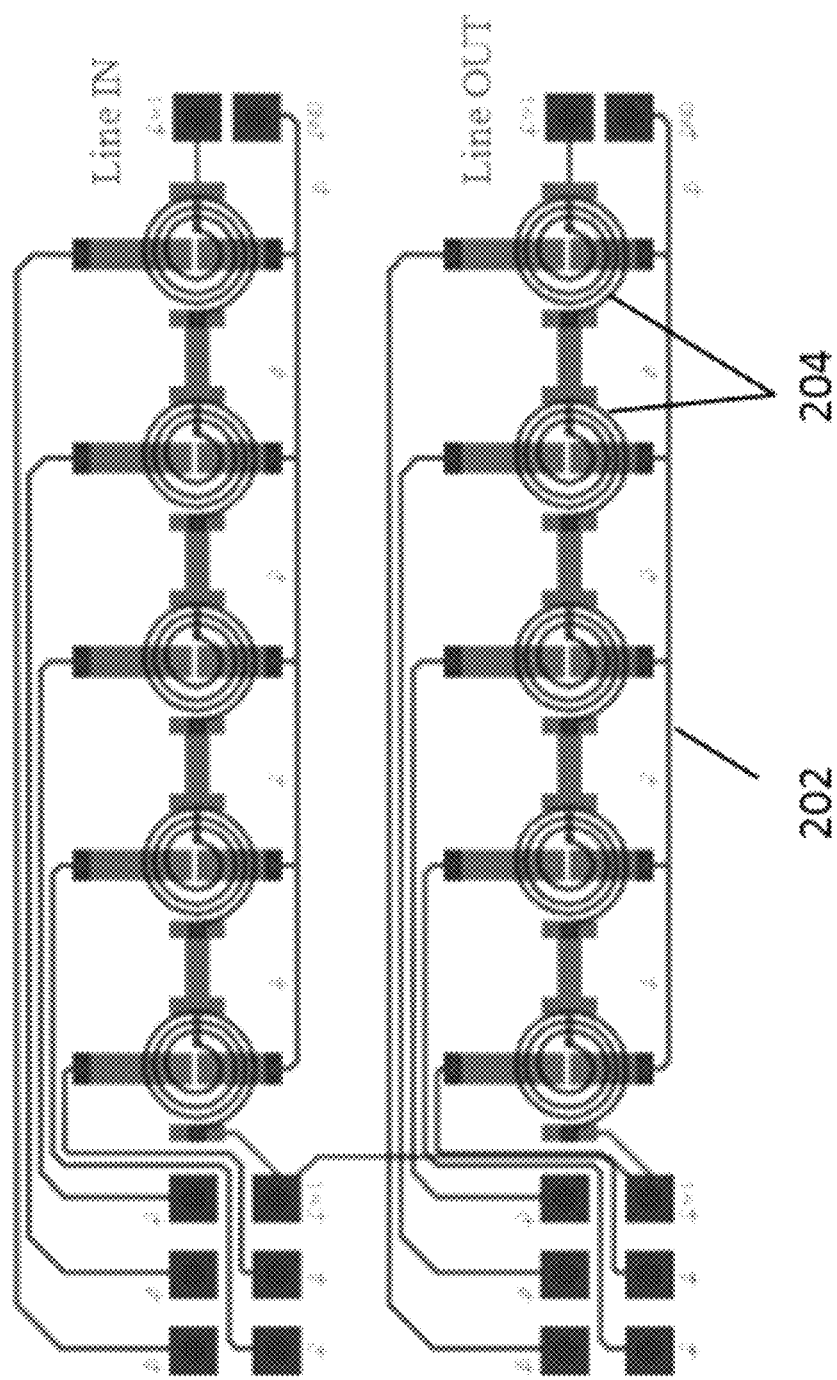
FIG. 7 shows electrical traces on a printed circuit board designed for electromagnetic actuation of resonant devices.

FIG. 7 shows electrical traces on a printed circuit board designed for electromagnetic actuation of resonant devices. A single electrical traces 202 connects the actuating coils 204 together. The layout of multiple actuators on a board or substrate can be such that the actuators have specific purposes when operated as a system. Positioning of the actuators is unencumbered by the need to produce independent address lines for each actuator.

Figure 8:
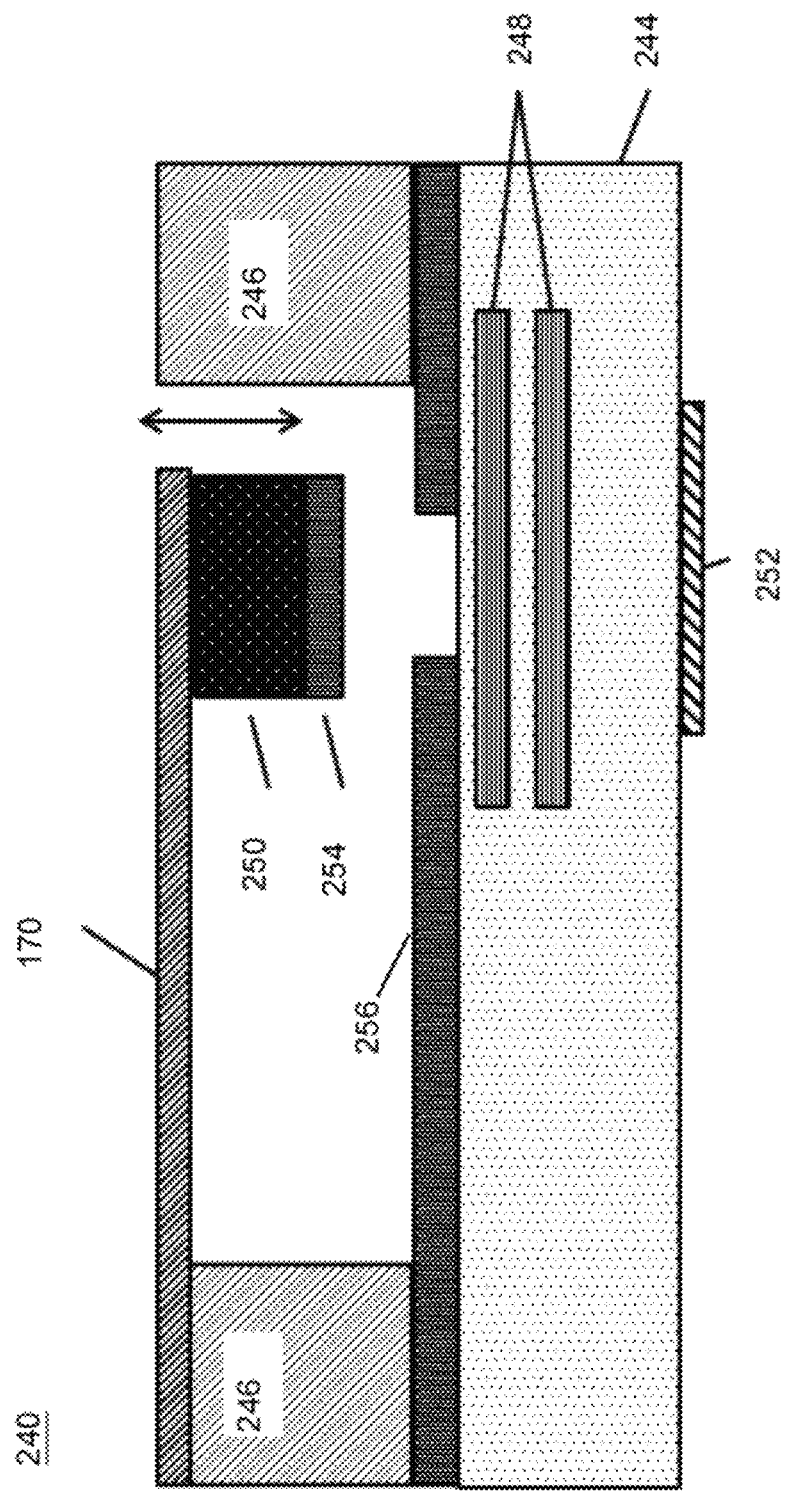
FIG. 8 shows a resonating cantilever switch.

Referring to FIG. 8, a simple embodiment of a frequency addressable actuator 240 that shows all the basic components is depicted. A movable component such as a cantilever 242 is the main element. As depicted, the cantilever 242 is positioned above a substrate 244 and spaced apart from the substrate 244 by being coupled at one end to a spacer element 246 mounted on the substrate 244. The cantilever 242 may be actuated be a mechanism, such as electromagnetic actuation through the use of a coil 248 and a magnet 250. If the cantilever 242 is pulled close enough to the bottom region of the substrate 244, a magnetic material, i.e., a latching component 252, in the device 240 will hold the magnet 250 down, thus latching it into the "down" state. If the cantilever 242 contains a conductive element 254, it can act as an electric switch that connects two or more electrodes 256. The device 240 is driven into a latched "on" state by using a time varying, pulsed or oscillating electromagnetic force. This is readily accomplished using an alternating current in the coil assembly 248 below the cantilever 242. At resonance, the cantilever structure 242 will produce a large displacement amplitude moving the cantilever 242 close to the latching component 252 in the substrate 244. Out of resonance, the cantilever 242 will only move a small amount, and will not latch. Thus, a time varying signal placed on the coil 248 can be used to put this device 240 into its latched state.

Figure 9:
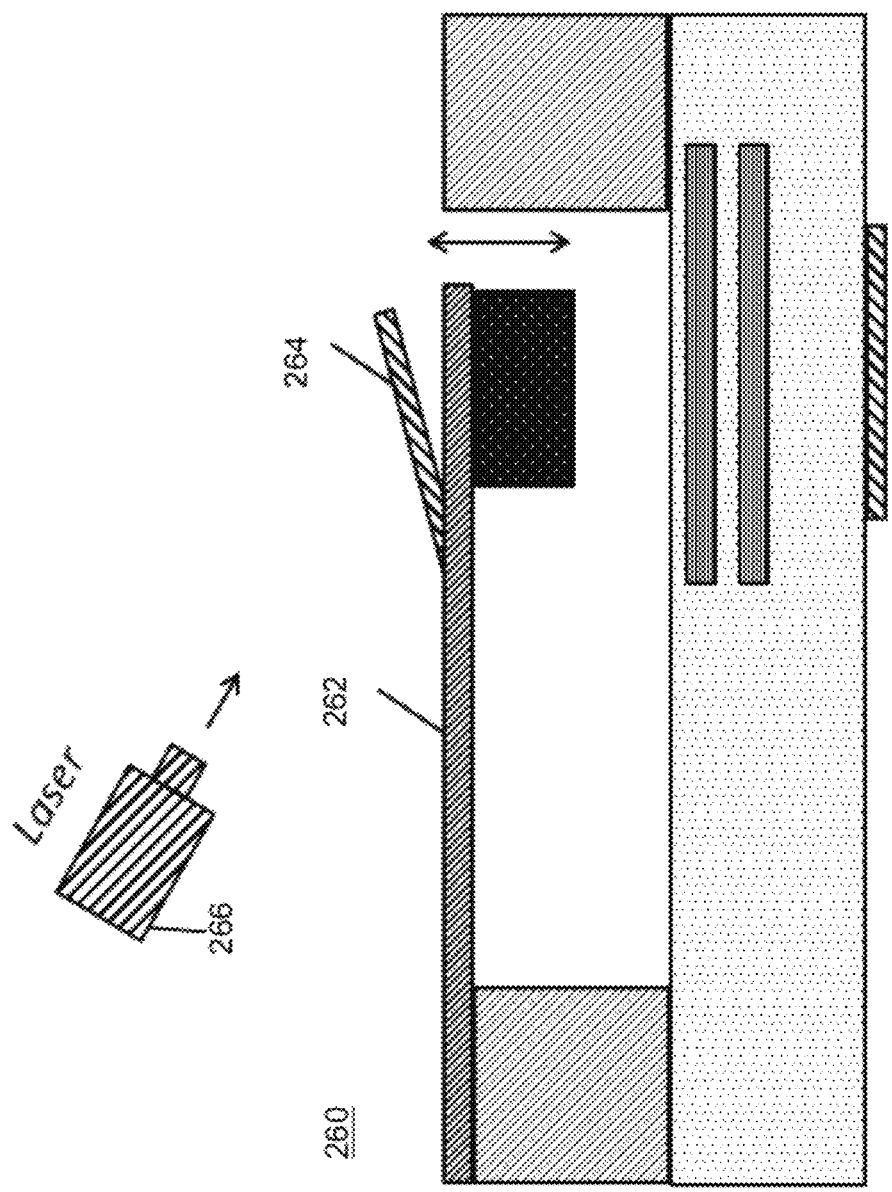
FIG. 9 shows a resonating cantilever mirror.
Figure 10:
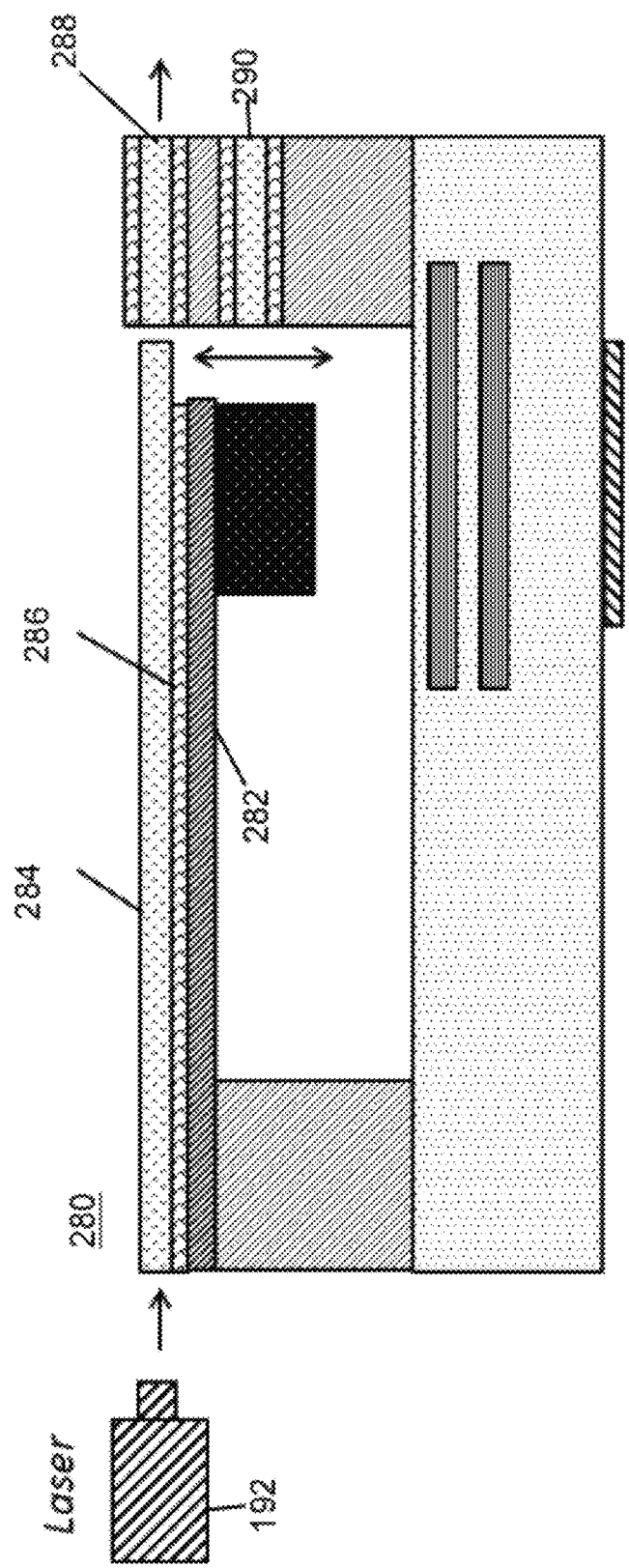
FIG. 10 shows a resonating waveguide switch.

FIG. 9 shows a similar construction 260 that allows the actuator to behave as a frequency addressable mirror. In this embodiment, the cantilever 262 is attached to a mirror 264. When light 266 is directed on the mirror 264 it will be deflected into a different location when the device is latched.

FIG. 20 shows a construction 280 where the device is configured to act as a waveguide optical switch. In this embodiment, the resonating cantilever 282 carries an optical waveguide 284 and cladding 286. The cantilever is constructed to be positioned in one of two locations to allow light to pass into a second waveguide 288 or third waveguide 290 depending on the state of the actuator. When light is directed into the cantilever waveguide 284, it can be switched into output waveguides 288 or 290 depending on the actuation frequency.

Figure 11:
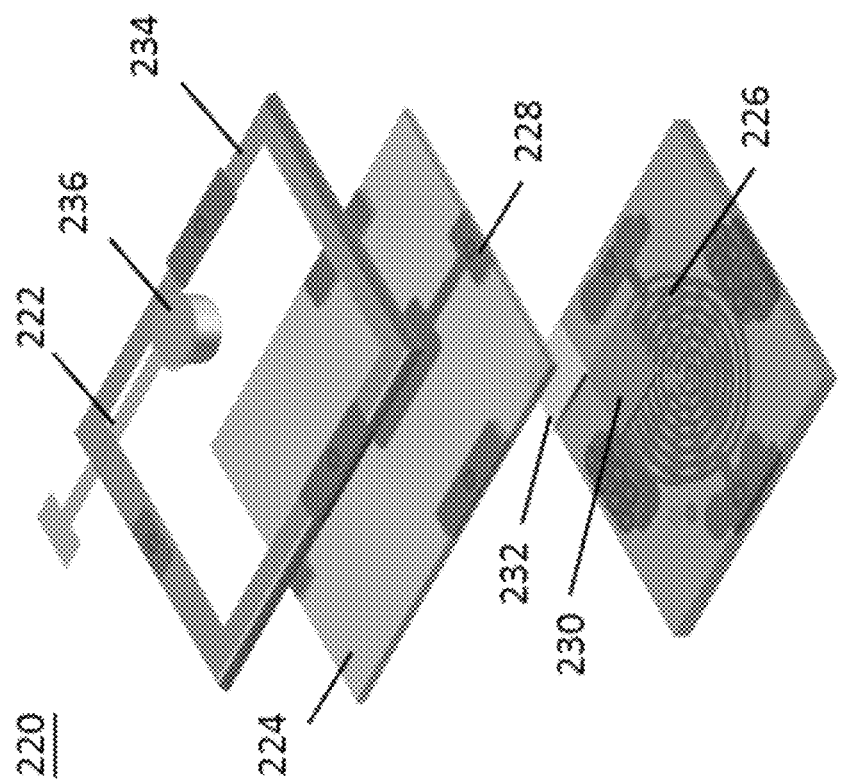
FIG. 11 shows an actuating device constructed using laminates.

FIG. 11 illustrates the components for and a method of building a simple frequency addressable micro-switch 220 by layering multiple laminates together. This device can be used to test switch designs. The shape of a cantilever 222 determines the resonant frequency of the device 220, and hence, the actuation frequency. As depicted, a double layer printed circuit board (PCB) 224 is formed with electromagnetic coils 226 on a bottom surface (not shown) and transmission line 228 formed on a top surface. A latching plate 230 is preferably formed of nickel (Ni) and positioned below the electromagnetic coils 226. An insulating layer 232 may be placed between the nickel plate 230 and coils 226, if needed. A pre-routed spacer 234 is coupled to the top of the PCB 224. The cantilever 222, preferably formed from a metal, polymer, or composite, is coupled at a first end to the spacer 234 using an adhesive or other method of coupling. A miniature-magnet 236 is positioned at a second end of the cantilever 222, which is spaced relation with the PCB 224 positioned above the coil 226. The magnet 236 may have a metal plating which may make electrical contact between an open gap in the the transmission line 228 which it is latched down by the nickel plate 230.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, unless otherwise stated, and the invention can be performed using different or additional process actions or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A system of actuators comprising
a control bus for delivering a time varying signal, and
a plurality of actuators coupled to the control bus, wherein one or more actuators of the plurality of actuators having a harmonic frequency that differs from one or more of the other actuators of the plurality of actuators, wherein individual actuators of the plurality of actuators are selectively actuatable in response to a single time varying actuating signal applied simultaneously to each actuator of the plurality of actuators,
wherein each actuator of the plurality of actuators is a resonating cantilever switch, and
wherein each cantilever switch comprises
a body,
a cantilever extending from the body at a first end of the cantilever and having a magnet on a second end, and
a dedicated coil positioned on the body in spaced relation with the magnet and the second end of the cantilever.

2. The system of claim 1 wherein the control bus is a single wire.

3. The system of claim 1 wherein separate ones of the plurality of actuators having a unique response to a time varying actuating signal.

4. The system of claim 3 wherein the plurality of actuators are configured in a series topology.

5. The system of claim 3 wherein the plurality of actuators are configured in a parallel topology.

6. The system of claim 3 wherein the plurality of actuators are configured in a branched topology.

7. The system of claim 6 wherein the branched topology includes a plurality of actuation lines comprising with one or more actuators and a plurality of addressable switches with separate ones of the plurality of addressable switches coupled to the separate ones of the plurality of actuation lines.

8. The system of claim 1 further comprising one or more inline filters coupled to the control bus.

9. The system of claim 1 wherein separate ones of the plurality of actuators having differing time based response to a time varying actuating signal.

10. The system of claim 1 wherein the plurality of actuators include one or more movable structures configured to latch at a certain amplitude.

11. The system of claim 1 wherein the plurality of actuators is configured to provide electrical switching.

12. The system of claim 1 wherein the plurality of actuators is configured to provide one of optical switching and optical reflecting.

13. The system of claim 1 wherein each of the plurality of actuators is a resonating cantilever mirror.

14. The system of claim 1 wherein each of the plurality of actuators is a resonating cantilever waveguide switch.

15. The system of claim 14 wherein the waveguide switch includes an input waveguide and a plurality of output waveguides.

16. The system of claim 1 wherein the cantilever switch further comprises a latching component positioned within the body in spaced relation with the coil, wherein the cantilever is drivable to a latched "on" state by application of a pulsed or oscillating electromagnetic force applied to the coil.

17. The system of claim 16 wherein the electromagnetic force is an alternating current.

18. The system of claim 16 further comprising a RF transmission line.

* * * * *